Patented Aug. 4, 1931

1,816,911

UNITED STATES PATENT OFFICE

JOHANNES PFLEGER, OF FRANKFORT-ON-THE-MAIN, AND EMIL SCHELLER, OF LORSBACH, TAUNUS, GERMANY, ASSIGNORS, BY MESNE ASSIGNMENTS, TO THE ROESSLER & HASSLACHER CHEMICAL COMPANY, A CORPORATION OF DELAWARE

PROCESS FOR THE PREPARATION OF ALKALI METAL DERIVATIVES OF ORGANIC COMPOUNDS

No Drawing. Application filed June 25, 1928, Serial No. 288,281, and in Germany June 30, 1927.

The object of this invention is the preparation of alkali derivatives of organic nitrogen compounds in which hydrogen atoms directly attached to a nitrogen atom are substituted by alkali metal.

We have found that an alkali metal hydride will react with organic compounds containing an amino ($-NH_2$) and/or imino ($=NH$) group to cause the substitution of the hydrogen atoms of these groups by alkali metal with the simultaneous production of hydrogen.

The reactions occurring in accordance with our invention may be illustrated by the following equations:

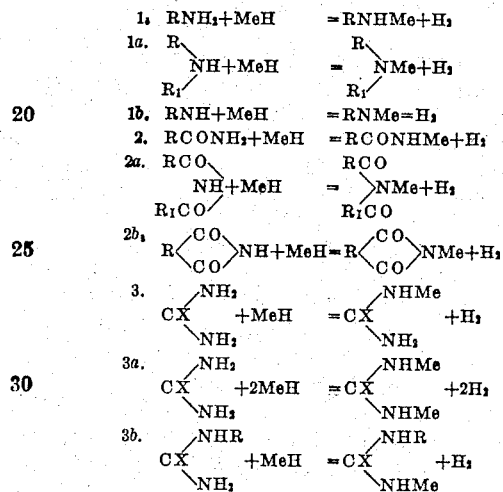

In the above equations R and $R_1$ represent similar or dissimilar hydrocarbon radicals such as alkyl, aryl, alkylaryl, or heterocyclic radicals, and in the case of (1b.) and (2b) cyclic compounds of the nature of triazoles, pyroles, and the like, or succinimide, etc., in which a nitrogen atom attached to the hydrogen to be substituted by alkali metal is a part of the ring. In the above equations $x$ represents an atom of oxygen or sulphur or a substituted or unsubstituted imino group.

We have found that the preparation of alkali metal derivatives of amino and imino compounds in accordance with our invention takes place at a considerably lower temperature than is the case when these are prepared by the old method of using an alkali metal with a catalyst. Our invention therefore makes possible the preparation economically of many compounds which could not have been prepared by previous methods because of the high temperatures which were necessary to cause the materials to react.

In carrying out the reactions of our invention, we can either mix the alkali metal hydride directly with the substance with which it is to react or we can dissolve and/or suspend the reaction materials in liquids or solvents which are indifferent to the reaction materials. In the cases of organic amino compounds either one or both of the hydrogen atoms attached to nitrogen may be replaced by alkali metal, and in the case of compounds containing both imino and amino groups, one or more of the hydrogen atoms capable of substitution may be replaced by alkali metal. The number and location of hydrogen atoms which will be replaced by alkali metal atoms will depend upon the nature of the organic nitrogen compounds and the conditions under which the reaction is carried out, such as temperatures, used, duration of contact or reaction materials, their relative proportions and concentrations, etc.

In order to illustrate the process of our invention and its wide applicability the following examples are given:

*Example I.* 150 parts by weight of aniline were mixed with 14 parts by weight of 85% NaH and the mixture heated. The reaction began at about 45° C. and continued very energetically. At the end of the reaction, as indicated by only a slight evolution of hydrogen gas, a thick solution of the monosodium derivative of aniline in free aniline resulted. This solution was filtered out of contact with air. The aniline was evaporated in a vacuum and a residue of sodium anilide in the form of a brownish red crust was obtained.

*Example II.* 46.5 parts by weight of aniline, 14 parts by weight of NaH and 175 parts of toluol were warmed up to about 65° C. whereupon reaction started and continued energetically. Upon evaporation of the toluol and any excess aniline, preferably in a vacuum, the residue of sodium anilide was obtained having a bright brownish gray appearance and in the form of a powder resembling sand, which immediately turned to a dark reddish brown color in the presence of air.

Compounds similar to aniline, such as o- and p-toluidine, xylidines, a-naphthylamine, etc. and even para-chloraniline, reacted with sodium hydride in a manner very much as aniline. It is remarkable that para-chloraniline will react with an alkali metal hydride to give an alkali metal derivative under the conditions of our invention, since it is known that the chlorine atom in the aniline derivative causes it to undergo complex reactions in the presence of strongly alkaline substances.

*Example III.* 140 parts of mono-methyl-aniline was made to react with 14 parts by weight of 85% sodium hydride. Reaction was started by heating the mixture to 80° C. and after the lively evolution of hydrogen gas at this temperature had begun to diminish, the reaction was finished by increasing the temperature of the reactants to about 100° C. over a water bath. After evaporation of the excess mono-methylaniline from the somewhat turbid brownish red liquid, the sodium mono-methylanilide.

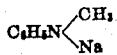

was obtained. This product was a transparent brownish mass of crystalline appearance, consisting of brownish yellow transparent parts of crystalline appearance as stated by the aid of a microscope more resistant than sodium aniline.

*Example IV.* A solution of 200 parts by weight of diphenyl amine and 14 parts of NaH (85%) were brought together in an apparatus fitted with a stirrer and heated on an oil bath to about 200–220° C. when a steady reaction began. After about 4 hours the reaction was complete and the thick mushy reaction mixture stirred up with toluol in small amount and filtered on a suction filter. The sodium derivative of diphenylamine was obtained in the form of a voluminous yellowish white powder which immediately changes to an intensive greenish black upon contact with air.

*Example V.* 15 parts by weight of acetamide, 7.2 by weight of 85% NaH, and 300 parts by weight of toluol were stirred together and heated. Hydrogen gas was evolved regularly at 40° C. and while the temperature was being gradually increased up to that of a water bath which was used to heat the reaction material. After filtering off the toluol the sodium compound of acetamide was obtained as a white powder. When the amount of toluol used was diminshed below that given above, the intensity of the reaction was increased very greatly.

Sodium hydride reacted with benzamide and other organic acid amides in a manner similar to that with acetamide.

*Example VI.* 15 parts of urea, 7.2 parts of NaH, and 100 parts of toluol by weight were heated together. The reaction began slowly at 40° C. and was very vigorous as the temperature was increased to 87° C. At the end of the reaction, heat was applied by means of a boiling water bath and then the reaction mixture was heated on an oil bath to the boiling point. The mono-sodium compound of urea was obtained from the reaction mixture as a white powder.

*Example VII.* 15 jarts of urea, 14.4 parts of NaH (85%) and 100 parts of xylol by weight were first brought together and the reaction started at about 89° C. When the evolution of hydrogen began to cease at this temperature, the reaction mixture was heated up to the boiling point over an oil bath for about 15 hours longer. This resulted in the production of the disodium compound of urea as a white powder. In this example the reaction can be completed in from 1 to 2 hours, instead of after 15 hours or more, by heating the reaction mixture at a higher temperature, such as about 200° C., and while using paraffin oil as a diluent.

*Example VIII.* 20.3 parts of guanidine nitrate suspended in 100 parts of toluol by weight were mixed with 100 parts of toluol and 9.6 parts by weight of NaH (83%). Immediately upon mixing, a lively evolution of hydrogen began on account of the neutralization of the nitric acid. After the neutralization reaction was complete, the reaction mixture was heated and stirred at about 60° C. At this temperature the reaction of the NaH with guanidine began. As the temperature was raised to that of the water bath, the reaction progressed more rapidly and was finally finished at the temperature at which the mixture boiled. The mono-sodium compound of guanidine was obtained from the reaction mixture as a yellowish white powder.

*Example IX.* In order to prepare the disodium compound of guanidine, the mixture of 20.3 parts of guanidine nitrate, 14.4 parts of NaH (83%), and 150 parts of xylol by weight were first heated on a water bath and then over an oil bath up to the boiling temperature and until the evolution of hydrogen ceased. The disodium compound of guanidine obtained from the reaction mixture was a yellowish white powder.

*Example X.* 37 parts of phthalimide was gradually heated up to 180° C., with 7.2 parts of NaH (83%) and 100 parts of paraffin oil. The reaction mixture was held at 180° C., until the reaction was completed. The sodium phthalimide was extracted as a white powder.

*Example XI.* 25 parts of succinimide were heated on a water bath with 7.2 parts of NaH (83%) and 100 parts of toluol by weight while stirring the mixture until the reaction was finished. By increasing the temperature to the boiling point of the mixture, the reaction of this example is more vigorous and is completed in a shorter time. The sodium compound of succinimide separated from the reaction mixture as a white powder.

*Example XII.* 25.25 parts of diacetamide were agitated with 7.2 parts of NaH (83%) and 100 parts of xylol by weight. The reaction began at 100° C. and became very vigorous at about 110–120° C. After a short period of heating, the reaction was finished and the sodium compound of diacetamide separated as a gray white powdery mass.

*Example XIII.* A mixture of 38 parts of phenylthiourea, 7.2 parts of NaH (83%) and 200 parts of toluol by weight was stirred and heated. The reaction began at 40° C. and was finished at the temperature of a water bath. The sodium compound of phenylthiourea separated from the reaction mixture as a voluminous white mass.

We do not wish our invention to be limited to the examples given above, since a large number of other nitrogen derivatives among which are for example: carbazole, benzidine, a-amino pyridine, p-amino acetophenone, amino triazole, amino thiazole, etc. may be used with alkali metal hydrides in accordance with our invention to produce alkali metal derivatives.

What we claim is:

1. A process for the preparation of alkali metal derivatives of organic nitrogen containing compounds containing at least one replaceable hydrogen atom attached to a nitrogen atom which comprises reacting said organic nitrogen containing compound with an alkali metal hydride.

2. A process for the preparation of sodium derivatives of organic nitrogen containing compounds containing at least one replaceable hydrogen atom attached to a nitrogen atom which comprises reacting said organic nitrogen containing compound with a sodium hydride.

3. A process for the preparation of alkali metal derivatives of organic nitrogen containing compounds containing at least one replaceable hydrogen atom attached to a nitrogen atom which comprises heating and reacting said organic nitrogen containing compound with an alkali metal hydride.

4. A process for the preparation of sodium derivatives of organic nitrogen containing compounds containing at least one replaceable hydrogen atom attached to a nitrogen atom which comprises heating and reacting said organic nitrogen containing compound with a sodium hydride.

Signed at Frankfort-on-the-Main, Germany, this 5th day of June, A. D. 1928.

JOHANNES PFLEGER.
EMIL SCHELLER.